Sept. 12, 1967  L. JOHANSON  3,341,231
OIL TUBE HOLDING CHUCK
Filed March 11, 1966
Fig. 1
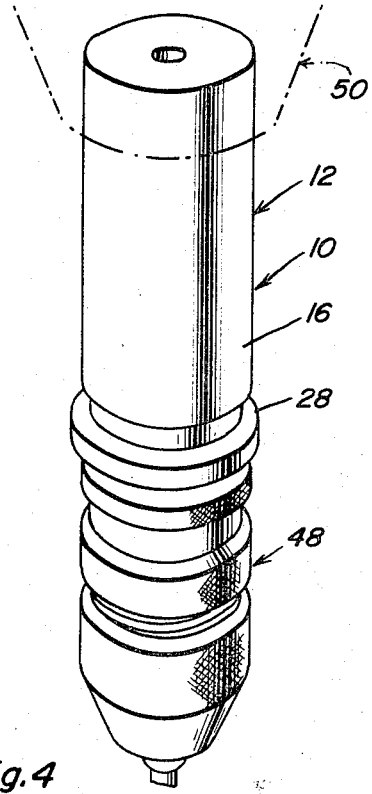
Fig. 2
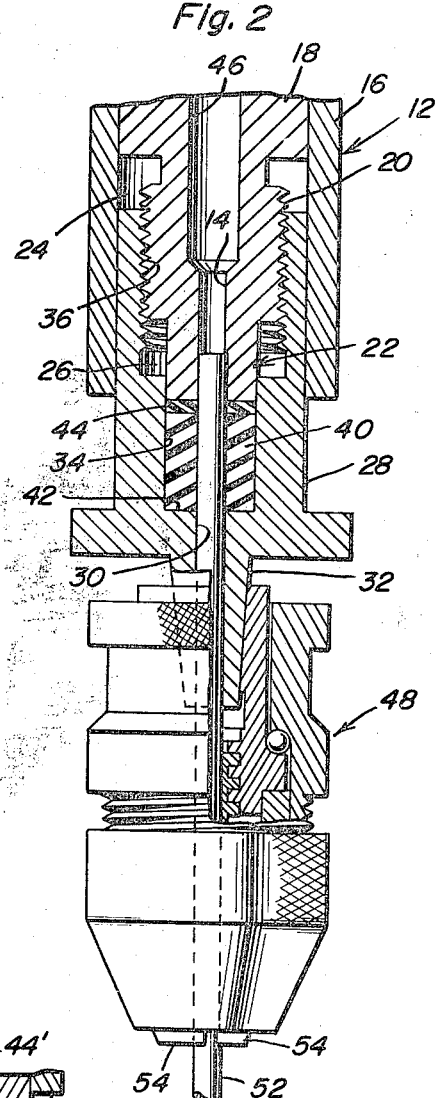
Fig. 4
Fig. 3
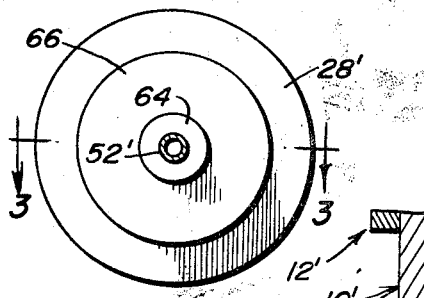
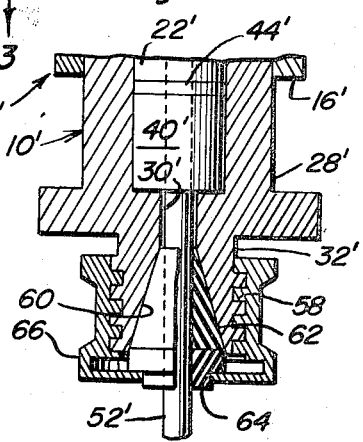
Lars Johanson
INVENTOR.
BY *Clarence A. O'Brien*
*and Harvey B. Jacobson*
Attorneys

United States Patent Office 3,341,231
Patented Sept. 12, 1967

3,341,231
OIL TUBE HOLDING CHUCK
Lars Johanson, 19 Fairfield Place,
West Caldwell, N.J. 07007
Filed Mar. 11, 1966, Ser. No. 533,678
5 Claims. (Cl. 285—322)

This invention relates to a novel and useful oil tube holding chuck and more specifically to a chuck adapted to hold an oil tube in a manner such that oil may be pumped through the tube to cool work being done by an associated E.D.M. (electrical discharge machine).

When utilizing an oil tube holding chuck, oil is pumped into the shank end of the chuck for discharge outwardly of the collet end of the chuck and the oil tube holding chuck of the instant invention includes means whereby a fluid-tight seal is formed between the shank end of the chuck and the oil tube supported from the chuck thereby causing all of the oil pumped into the shank end of the chuck to pass through the tube and outwardly of the end of the tube projecting from the collet end of the chuck.

The main object of this invention is to provide an "oil through chuck" capable of supporting an oil tube therefrom in a manner such that oil pumped into the shank end of the chuck will be caused to flow through the oil tube supported by the chuck.

Anther object of this invention is to provide an "oil through chuck" including structural features enabling it to be readily produced so as to be capable of supporting various size oil tubes.

Yet another object of this invention is to provide an "oil through chuck" for holding an oil tube which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the oil tube holding chuck of the instant invention having an Albrecht chuck operatively associated therewith;

FIGURE 2 is an enlarged fragmentary longitudinal vertical sectional view taken substantially upon a plane passing through the longitudinal centerline of the oil tube holding chuck and with the Albrecht chuck illustrated in elevation but having parts thereof broken away and also illustrated in longitudinal section;

FIGURE 3 is an enlarged fragmentary longitudinal vertical sectional view of a modified form of oil tube holding chuck taken substantially upon a plane indicated by the section line 3—3 of FIGURE 4; and FIGURE 4 is a bottom plan view of the modified form of oil tube holding chuck of FIGURE 3 with the oil tube supported thereby illustrated in horizontal section.

Referring now more specifically to the drawings, the numeral 10 generally designates the oil tube holding chuck of the instant invention which includes an elongated body generally referred to by the reference numeral 12 and having a longitudinal bore 14 extending therethrough. The body 12 includes an outer guide sleeve 16 into which an elongated shank-type body member 18 is pressed. The bore 14 is formed in the body member 18 and one end of the body member 18 includes a first diametrically reduced and externally threaded portion 20 which terminates at its free end in a second and further diametrically reduced smooth shank portion 22. A first annular space 24 is defined between the sleeve 16 and the shank portion 20 and a second annular space 26 is enclosed about the second shank portion 22 within the sleeve 16.

A further sleeve generally designated by the reference numeral 28 has a longitudinal bore 30 formed therethrough which also extends through a tapered neck or shank portion 32 projecting from one end of the sleeve 28. The sleeve 28 includes first and second counterbores 34 and 36 and it may be seen from FIGURE 2 that the second counterbore 36 is internally threaded.

The end of the sleeve 28 in which the second counterbore 36 is formed is telescoped within the sleeve 16 and partially occupies the annular spaces 24 and 26. The sleeve 28 is threadedly engaged with the externally threaded portion 20 of the body member 18 and the smooth shank portion 22 is partially received within the second counterbore 34.

A resilient and axially compressible and radially expandable sealing sleeve 40 is snugly disposed within the first counterbore 34 against the shoulder 42 defined at the bottom of the first counterbore 34 and an annular anti-friction thrust member 44 is also disposed in the first counterbore 34 between the sleeve 40 and the second shank portion 22.

The openings formed through the thrust member 44 and the sleeve 40 comprise continuations of the bores 14 and 30, which are axially aligned, and it may also be seen from FIGURE 2 of the drawings that the bore 14 includes a counterbore 46.

A conventional Albrecht chuck generally referred to by the reference numeral 48 is provided and is wedgingly seated on the tapered neck or shank portion 32 in a manner which is believed obvious. The sleeve 16 is adapted to be held in any conventional electrode chuck such as that designated generally by the reference numeral 50 in FIGURE 1 and an oil tube 52 may have one end portion thereof disposed within the bore 14 with the remainder of the tube 52 extending through the thrust member 44, the sleeve 40, the bore 30, and the Albrecht chuck 48. Of course, the Albrecht chuck 48 includes a plurality of gripping fingers 54 for frictionally gripping the tube 52.

After inserting the tube 52 in the oil tube holding chuck 10 in the manner illustrated in FIGURE 2 of the drawings, the sleeve 28 may be rotated relative to the sleeve 16 by means of its annular flange axially spaced from the lower end of the guide sleeve as shown in FIGURES 1 and 2 so as to move the shoulder 42 toward the opposing end of the second shank portion 22 thereby axially compressing the sleeve 40 and causing the latter to expand radially into tight frictional engagement with the surfaces of the sleeve 28 defining the first counterbore 34 and the outer surfaces of the oil tube 52. Additionally, the Albrecht chuck 48 may then be adjusted to cause the fingers 54 to tightly grip the tube 52.

Referring now more specifically to FIGURES 3 and 4 of the drawings there will be seen a modified form of oil tube holding chuck generally referred to by the reference numeral 10'. Portions of the chuck 10' which correspond to the check 10 are designated with prime numerals corresponding to the numerals applied to the similar portions of the chuck 10.

The chuck 10' differs from the chuck 10 in that the neck or shank portion 32' thereof is externally threaded as at 58. Further, the neck portion 32' includes a tapered counterbore 60 at the corresponding outer end of the bore 30' and a plurality of resilient wedge-shaped collet fingers or elements 62 are disposed within the tapered counterbore 60 with an annular resilient thrust member 64 disposed over their outer ends and held captive by a threaded cap member 66 which is threadedly engaged with the neck portion 32'. It may therefore be readily appreciated that the cap 66 may be advanced toward the inner end of the bore 30' in order to cause the resilient fingers 62 to frictionally grip the tube 52'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An oil tube holding chuck comprising an elongated rigid body having a fluid conducting bore extending longitudinally therethrough, one end of said body having an annular groove therein extending axially from said one end to a position within said body, said groove being defined by axially extending inner and outer walls and a radially extending portion bridging the distance between the walls at the axial inner end of said groove, a portion of one wall of said body spaced from said one end being externally threaded, a compression sleeve rotatably received within said body and having a bore extending longitudinally therethrough, one integral end of said sleeve including an enlarged counterbore and defining an annular shoulder at its inner end, said one end of the compression sleeve having an axially extending portion defined in part by the inner wall of said counterbore, said portion having a radial thickness closely approaching the radial distance between the walls of said groove in the body so as to be snugly received therein, said axially extending portion being internally threaded for threaded engagement with said externally threaded wall of said body, an axially compressible resilient sealing sleeve snugly disposed in the inner end of said counterbore and held captive between said shoulder and the adjacent end of said elongated body so that when said compression sleeve is threadedly received within said body, said sealing sleeve is axially compressed by abutment between the inner end of the counterbore and the end of the compression sleeve, said bores being aligned and said sealing sleeve defining a bore extending therethrough aligned with the first two mentioned bores, the other end of said compression sleeve including chuck means adapted to frictionally grip an oil tube disposed in the bores and of a diameter adapted to be snugly received through the bore in said sealing sleeve.

2. The combination of claim 1 wherein said chuck means is removably supported from said other end of said compression sleeve.

3. The combination of claim 2 wherein said other end of said compression sleeve includes an axially projecting tapered shank through which the bore in said sleeve extends, said chuck means comprising a jaw-type chuck whose body includes a tapered bore in which said shank is wedgingly receivable.

4. The combination of claim 1 wherein said other end of said compression sleeve is externally threaded and the corresponding terminal end of the bore extending through said sleeve includes an inwardly tapering counterbore, said chuck means including a plurality of wedge-type resilient collet jaws disposed in said tapering counterbore and means for adjustably urging said jaws inwardly of said tapering counterbore.

5. The combination of claim 1 wherein said one end of said body includes a diametrically reduced shank-type terminal end portion through which the bore in said body extends and said compression sleeve including a second counterbore in the outer end of the first-mentioned counterbore and of a diameter greater than the first-mentioned counterbore, said second counterbore being internally threaded and comprising the portion of said compression sleeve threadedly telescopingly engaged within said one end of said body, said shank-type terminal end of said body being snugly disposed in the first-mentioned counterbore in said compression sleeve.

References Cited

UNITED STATES PATENTS

| | | | |
|---|---|---|---|
| 1,086,641 | 2/1914 | Blume | 285—322 X |
| 1,604,580 | 10/1926 | Jaques | 285—322 X |
| 1,872,536 | 8/1932 | Weatherhead | 285—342 X |
| 2,322,691 | 6/1943 | Hensel | 285—322 |
| 2,517,689 | 8/1950 | Lement | 285—133 X |
| 2,909,376 | 10/1959 | Drew | 279—20 |
| 3,024,030 | 3/1962 | Koch | 279—20 |

FOREIGN PATENTS

| | | |
|---|---|---|
| 70,957 | 1/1916 | Austria. |

CARL W. TOMLIN, *Primary Examiner.*

D. W. AROLA, *Assistant Examiner.*